United States Patent
Jang et al.

(10) Patent No.: US 9,458,280 B2
(45) Date of Patent: Oct. 4, 2016

(54) POLISHING PAD COMPOUND

(71) Applicant: SAMSUNG ELECTRONICS CO., LTD., Suwon-si, Gyeonggi-do (KR)

(72) Inventors: Youngjun Jang, Suwon-si (KR); Bong-Su Ahn, Seoul (KR); Jin-Su Jeong, Seoul (KR); Jungsik Choi, Seongnam-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/299,580

(22) Filed: Jun. 9, 2014

(65) Prior Publication Data
US 2014/0364578 A1 Dec. 11, 2014

(30) Foreign Application Priority Data
Jun. 10, 2013 (KR) .................. 10-2013-0066083

(51) Int. Cl.
*C08G 18/75* (2006.01)
*C08G 18/48* (2006.01)
*C08G 18/76* (2006.01)

(52) U.S. Cl.
CPC ......... *C08G 18/758* (2013.01); *C08G 18/4833* (2013.01); *C08G 18/4854* (2013.01); *C08G 18/7621* (2013.01)

(58) Field of Classification Search
None
See application file for complete search history.

(56) References Cited

U.S. PATENT DOCUMENTS

| | | | |
|---|---|---|---|
| 4,327,204 A * | 4/1982 | Oyaizu | C08G 18/10 528/61 |
| 6,046,297 A * | 4/2000 | Rosenberg et al. | 528/63 |
| 7,414,080 B2 | 8/2008 | Kulp | |
| 2007/0264919 A1* | 11/2007 | Kobayashi | B24B 37/24 451/533 |
| 2011/0034578 A1* | 2/2011 | Zhang et al. | 521/160 |
| 2011/0039966 A1 | 2/2011 | Goto et al. | |
| 2012/0083187 A1 | 4/2012 | Okamoto et al. | |
| 2012/0100783 A1 | 4/2012 | Itoyama et al. | |

FOREIGN PATENT DOCUMENTS

| | | |
|---|---|---|
| JP | 2008-238324 A | 10/2008 |
| JP | 2010-240770 A | 10/2010 |
| JP | 2011-212775 A | 10/2011 |
| JP | 2011-212794 A | 10/2011 |
| KR | 10-2006-0022044 A | 3/2006 |

* cited by examiner

*Primary Examiner* — Jeffrey Washville
(74) *Attorney, Agent, or Firm* — Lee & Morse, P.C.

(57) ABSTRACT

A polishing pad compound and a polishing pad, the polishing pad compound including a pre-polymer; and a hardener, wherein the pre-polymer includes about 45 wt % to about 50 wt % of a polyol, about 5 wt % to about 25 wt % of a hardness regulator, and a balance of an isocyanate.

8 Claims, 6 Drawing Sheets

POLISHING PAD COMPOUND

CROSS-REFERENCE TO RELATED APPLICATION

Korean Patent Application No. 10-2013-0066083, filed on Jun. 10, 2013, in the Korean Intellectual Property Office, and entitled: "Polishing Pad Compound," is incorporated by reference herein in its entirety.

BACKGROUND

1. Field

Embodiments relate to a polishing pad compound.

2. Description of the Related Art

In a chemical mechanical polishing (CMP) process, a surface of a wafer may be mechanically polished by abrasives and chemically reacted with acid or basic solution.

SUMMARY

Embodiments are directed to a polishing pad compound.

The embodiments may be realized by providing a polishing pad compound including a pre-polymer; and a hardener, wherein the pre-polymer includes about 45 wt % to about 50 wt % of a polyol, about 5 wt % to about 25 wt % of a hardness regulator, and a balance of an isocyanate.

The pre-polymer and the hardener may be mixed in an equivalent weight ratio of 1:1.

The polyol may include at least one selected from the group of ethylene glycol, poly ethylene glycol (PEG), propylene glycol, poly propylene glycol (PPG), and poly tetramethylene glycol (PTMG).

The polyol may have a molecular mass of about 1,000 or higher.

The hardness regulator may include dicyclohexylmethane-4,4'-diisocyanate.

The isocyanate may include toluene diisocyanate.

The pre-polymer may include about 9.0 wt % to about 9.5 wt % of a —N=C=O group.

The hardener may include methylenebis(2-chloroaniline).

The polishing pad compound may have a shore-D hardness of about 70 to about 75.

The embodiments may be realized by providing a polishing pad prepared using the polishing pad compound according to an embodiment.

The embodiments may be realized by providing a polishing pad including a hardness regulator.

The hardness regulator may include dicyclohexylmethane-4,4'-diisocyanate.

The polishing pad may include the hardness regulator in an amount of about 2.5 wt % to about 12.4 wt %, based on a total weight of the polishing pad.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
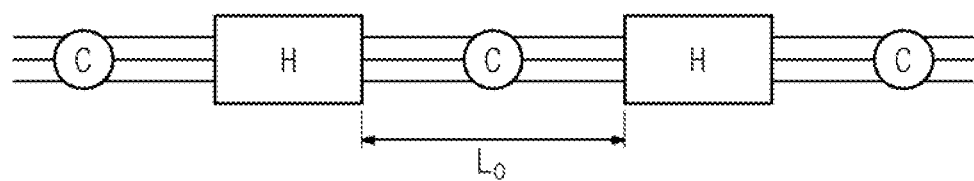
FIGS. 1A and 1B illustrate diagrams of a structure of a polishing pad compound according to example embodiments and a structure of a comparative polishing pad compound.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Polishing Pad Compound

A polishing pad compound may include a pre-polymer and a hardener. The pre-polymer and the hardener may be included in the compound in a ratio, e.g., an equivalent weight ratio, of about 1:1.

The pre-polymer may include, e.g., a polyol, a hardness regulator, and an isocyanate. In an implementation, the pre-polymer may include about 45 wt % to about 50 wt % of the polyol and about 5 wt % to about 25 wt % of the hardness regulator. A balance (wt %) of the pre-polymer may be the isocyanate.

The polyol may include at least one selected from the group of ethylene glycol, poly ethylene glycol (PEG), propylene glycol, poly propylene glycol (PPG), and poly tetramethylene glycol (PTMG). In an implementation, the polyol may have a molecular mass of about 1,000 or higher. The hardness regulator may include, e.g., $H_{12}MDI$ (dicyclohexylmethane-4,4'-diisocyanate). The isocyanate may include, e.g., toluene diisocyanate (TDI).

In an implementation, the pre-polymer may include an isocyanate group (—N=C=O) in an amount of about 9.0 wt % to about 9.5 wt %.

The hardener may include, e.g., methylenebis(2-chloroaniline) (MOCA) (e.g., 4-[(4-amino-3-chlorophenyl)methyl]-2-chloroaniline).

A polishing pad compound fabricated by example embodiments may be or may include a polyurethane. The polyurethane may include urethane bonds (e.g., R—NHCO—R') formed by bonding between an isocyanate functional group (e.g., R—NCO) and an alcohol functional group (e.g., R'—OH).

Urea bonds (e.g., R—NHCONH—R') may be produced by bonding between the isocyanate functional group (e.g., R—NCO) and an amine group (e.g., R'—NH$_2$).

The hardness regulator may be contained in the polishing pad compound, and the polishing pad prepared using the polishing pad compound may have an increased hardness. This will be described in more detail with reference to the drawings.

Figure 1B:
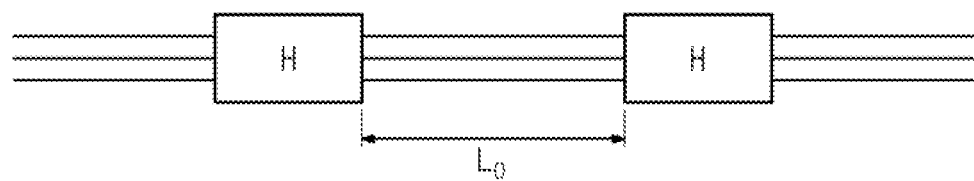

FIGS. 1A and 1B illustrate diagrams of a structure of a polishing pad compound according to example embodiments and a structure of a comparative polishing pad compound.

Referring to FIGS. 1A and 1B, an isocyanate functional group (e.g., R—NCO) and an alcohol functional group (e.g., R'—OH) may be bonded, thereby forming urethane bonds (e.g., R—NHCO—R'). A polyol (containing the alcohol functional group) may correspond to a soft segment or region in the polishing pad structure, and an isocyanate (containing the isocyanate functional group) may correspond to a hard segment or region H in the polishing pad structure.

As shown in FIG. 1A, the hardness regulator C (e.g., containing the $H_{12}MDI$ material) may be included between adjacent hard segments H. Thus, it may be possible to increase the hardness of the polishing pad. For example, as shown in FIG. 1B, if a distance between the adjacent hard segments H is $L_0$, the hardness regulator C may be provided between the adjacent hard segments H as shown in FIG. 1A. Accordingly, the polishing pad of FIG. 1A may have an increased hardness.

Structural and material properties of the polishing pad compound will be described in more detail below with reference to the experimental embodiments.

Method of Fabricating a Polishing Pad

A pre-polyol and a hardener may be mixed at a ratio, e.g., an equivalent weight ratio, of about 1:1. In an implementation, a solution of the pre-polyol and the hardener may be mixed by a rotation at a temperature of about 70° C. to about 85° C. Contents and materials of the pre-polyol and the hardener may be substantially equal to those in the above description, and thus, for concise description, overlapping description thereon may be omitted.

A pore-inducing material may be added in the solution mixed with the pre-polyol and the hardener. The pore-inducing material may include, e.g., an inactive or inert gas such as nitrogen gas ($N_2$), a capsule-type foaming agent, and/or a chemical foaming agent.

The added pore-inducing material may produce pores in the solution, in which the pre-polyol and the hardener are mixed. The solution including the pores may be dried to form the polishing pad.

CMP System

Figure 2:
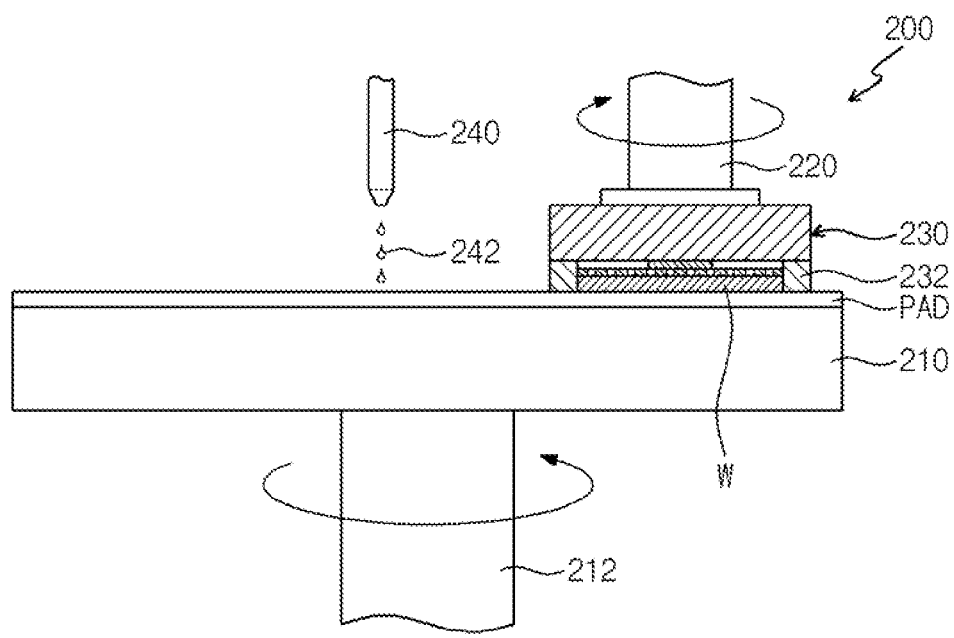
FIG. 2 illustrates a sectional view of a CMP system.

FIG. 2 illustrates a sectional view of a polishing system.

Referring to FIG. 2, the polishing system may include a turning table 210 including a polishing pad PAD thereof, a polishing head 230 facing the turning table 210, a slurry supplying part 240 adjacent to the polishing pad PAD, and a polishing pad conditioner (not shown).

The turning table 210 may be shaped like a circular disk. A driving part 212 may be connected to a bottom of the turning table 210, thereby providing a rotating force to the turning table 210. The polishing pad PAD may be attached on a top surface of the turning table 210 to polish a polishing-target surface.

According to an embodiment, the polishing pad PAD may be fabricated using the afore-described polishing pad compound. The polishing pad PAD may contain the hardness regulator, thereby having higher hardness. In addition, a plurality of the pores may be formed in the polishing pad PAD. The slurry that is supplied to polish the polishing-target surface may be stored in the pores of the polishing pad PAD.

Although not shown, a polishing end-point detecting part may be provided in the turning table 210 to measure a polishing amount of the polishing-target surface and detect a polishing end-point. The polishing end-point detecting part may include a light source generating light, a splitter for reflecting the light toward the polishing-target surface, and a light detecting part measuring the light reflected from the polishing-target surface and thereby estimating the polishing amount of the polishing-target surface and the polishing end-point. In addition, a slot may be formed in the turning table 210. The slot may serve as an optical path allowing the light to be transmitted, and a transparent window for allowing the light to be transmitted may be formed in the polishing pad PAD.

A wafer W (having the polishing-target surface) may be held by the polishing head 230 in such a way that the polishing-target surface faces the turning table 210. During the CMP process on the wafer W, the polishing head 230 may stick the polishing-target surface to the polishing pad PAD. A driving part 220 for rotating the wafer W may be connected to the polishing head 230. The polishing head 230 and the turning table 210 may have different rotating directions from each other. Alternatively, the polishing head 230 and the turning table 210 may have the same rotating direction.

Although not shown, an air housing may be formed in the polishing head 230 to enhance the holding of the wafer W and the sticking of the polishing-target surface of the wafer W to the polishing pad PAD. The air housing may be expanded or contracted to control the sticking and holding of the wafer W. A retainer ring 232 may be provided on a bottom edge portion of the polishing head 230 to fasten the wafer W. The retainer ring 232 and the wafer W may be stuck to the polishing pad PAD, during the CMP process on the wafer W.

The slurry supplying part 240 may supply the slurry 242 onto the polishing pad PAD. The slurry 242 may contain polishing particles for polishing the wafer W in a mechanical manner.

In the case where the polishing-target surface includes oxide, ceria slurry and/or silica slurry may be used for the slurry 242.

The polishing pad conditioner may be disposed on the polishing pad PAD and may spray a pressurized vapor onto a surface of the polishing pad PAD, thereby improving a surface state of the polishing pad PAD.

To planarize the surface of the semiconductor wafer W, the CMP process using the CMP system may be performed according to the following method.

The wafer W may be held by the polishing head 230 in such a way that the polishing-target surface of the wafer W faces the polishing pad PAD. The polishing pad PAD may be rotated by rotating the turning table 210. The wafer W may be stuck onto a top surface of the rotating polishing pad PAD. Here, the slurry 242 may be supplied from the slurry supplying part 240 to the polishing pad PAD.

The polishing-target surface of the wafer W may be chemically and mechanically polished by the slurry 242 contained in the pores of the polishing pad PAD and the rotation of the polishing pad PAD. The pores of the polishing pad PAD may be sealed by a mixture of a polishing side product and the slurry 242.

The mixture may pull out from the pores of the polishing pad PAD by a conditioner supplied from the polishing pad conditioner and then be removed from the polishing pad PAD by the rotation of the polishing pad PAD.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXPERIMENTAL EMBODIMENTS

Example 1

50 wt % of a polyol, in which PTMG, PPG, and PEG were mixed in a ratio of 1:1:1, was mixed with 45 wt % of toluene diisocyanate (TDI) and 5 wt % of $H_{12}MDI$, to synthesize 100 wt % of a pre-polymer. The pre-polymer and methylenebis(2-chloroaniline) (MOCA) were mixed at an equivalent weight ratio of 1:1 to form a polishing pad compound. The pre-polymer contained 9.3 wt % of an isocyanate group (—NCO).

Example 2

50 wt % of a polyol, in which PTMG, PPG, and PEG were mixed in a ratio of 1:1:1, was mixed with 40 wt % of toluene diisocyanate (TDI) and 10 wt % of $H_{12}MDI$, to synthesize 100 wt % of a pre-polymer. The pre-polymer and methylenebis(2-chloroaniline) (MOCA) were mixed at an equivalent weight ratio of 1:1 to form a polishing pad compound. The pre-polymer contained 9.3 wt % of an isocyanate group (—NCO).

Example 3

45 wt % of a polyol, in which PTMG, PPG, and PEG were mixed in a ratio of 1:1:1, was mixed with 40 wt % of toluene diisocyanate (TDI) and 15 wt % of $H_{12}MDI$, to synthesize 100 wt % of a pre-polymer. The pre-polymer and methylenebis(2-chloroaniline) (MOCA) were mixed at an equivalent weight ratio of 1:1 to form a polishing pad compound. The pre-polymer contained 9.3 wt % of an isocyanate group (—NCO).

Example 4

40 wt % of a polyol, in which PTMG, PPG, and PEG were mixed in a ratio of 1:1:1, was mixed with 40 wt % of toluene diisocyanate (TDI) and 20 wt % of $H_{12}MDI$, to synthesize 100 wt % of a pre-polymer. The pre-polymer and methylenebis(2-chloroaniline) (MOCA) were mixed at an equivalent weight ratio of 1:1 to form a polishing pad compound. The pre-polymer contained 9.3 wt % of an isocyanate group (—NCO).

Example 5

40 wt % of a polyol, in which PTMG, PPG, and PEG were mixed in a ratio of 1:1:1, was mixed with 35 wt % of toluene diisocyanate (TDI) and 25 wt % of $H_{12}MDI$, to synthesize 100 wt % of a pre-polymer. The pre-polymer and methylenebis(2-chloroaniline) (MOCA) were mixed at an equivalent weight ratio of 1:1 to form a polishing pad compound. The pre-polymer contained 9.3 wt % of an isocyanate group (—NCO).

Example 6

35 wt % of a polyol, in which PTMG, PPG, and PEG were mixed in a ratio of 1:1:1, was mixed with 35 wt % of toluene diisocyanate (TDI) and 30 wt % of $H_{12}MDI$, to synthesize 100 wt % of a pre-polymer. The pre-polymer and methylenebis(2-chloroaniline) (MOCA) were mixed at an equivalent weight ratio of 1:1 to form a polishing pad compound. The pre-polymer contained 9.3 wt % of an isocyanate group (—NCO).

Comparative Example 50 wt % of a polyol, in which PTMG, PPG, and PEG were mixed in a ratio of 1:1:1 was mixed with 50 wt % of toluene diisocyanate (TDI), to synthesize 100 wt % of a pre-polymer. The pre-polymer and methylenebis(2-chloroaniline) (MOCA) were mixed at an equivalent weight ratio of 1:1 to form a polishing pad compound. The pre-polymer contained 10 wt % of an isocyanate group (—NCO).

The following Table 1 summarizes materials used in Examples 1 to 6 and the Comparative Example and weight percent thereof.

TABLE 1

| | pre-polymer (wt %) | | | | | Hardener (wt %) |
|---|---|---|---|---|---|---|
| | polyol | | | | | |
| | PTMG | PPG | PEG | TDI | $H_{12}MDI$ | |
| Example 1 | 8.33 | 8.33 | 8.33 | 22.5 | 2.5 | 50 |
| Example 2 | 8.33 | 8.33 | 8.33 | 20 | 5.0 | 50 |
| Example 3 | 7.50 | 7.50 | 7.50 | 20 | 7.5 | 50 |
| Example 4 | 6.66 | 6.66 | 6.66 | 20 | 10 | 50 |
| Example 5 | 6.66 | 6.66 | 6.66 | 17.5 | 12.5 | 50 |
| Example 6 | 5.83 | 5.83 | 5.83 | 17.5 | 15 | 50 |
| Comparative Example | 8.33 | 8.33 | 8.33 | 25 | 0 | 50 |

Structures of the Synthesized Polishing Pad Compound

Figure 3:
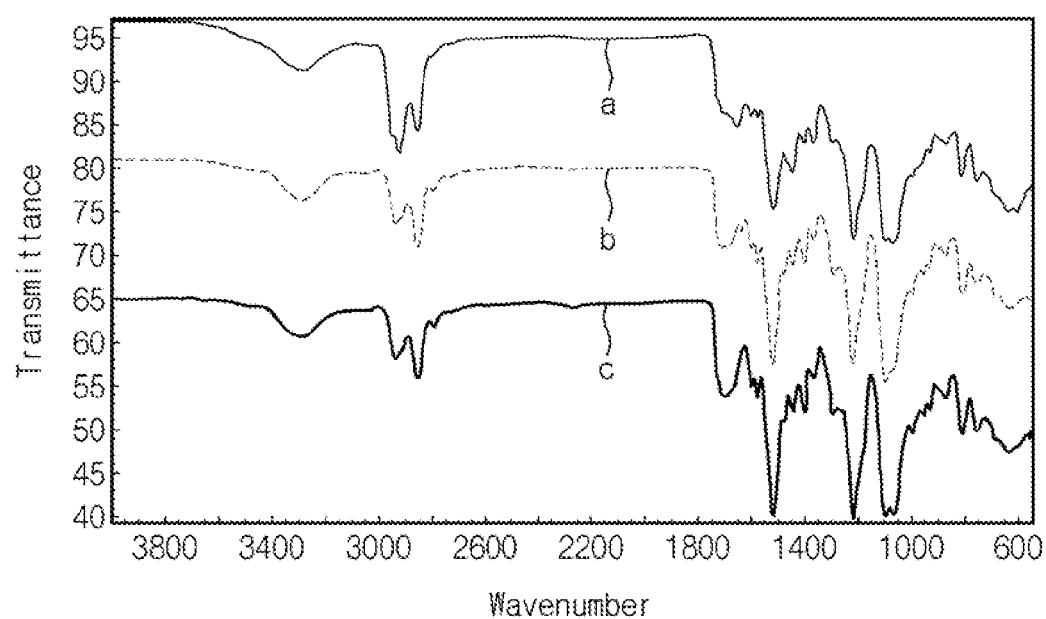
FIG. 3 illustrates a FT-IR graph for materials that are contained in the polishing pad compound according to example embodiments and a comparative polishing pad compound.

FIG. 3 illustrates a Fourier-transform infrared-spectrometer (FT-IR) graph for materials that were contained in the polishing pad compound according to example embodiments and the comparative polishing pad compound.

FT-IR curves (a), (b) and (c) of FIG. 3 were obtained from polishing pads of the Comparative Example, Example 3, and Example 5, respectively.

In FT-IR curves (a), (b) and (c) of FIG. 3, peaks at about 1,350 $cm^{-1}$ to about 1,700 $cm^{-1}$ represent the presence of C=O, peaks at about 2,880 $cm^{-1}$ to about 3,000 $cm^{-1}$ represent the presence of C—H, $CH_2$ and $CH_3$. This means that polyol existed in the polishing pads. Further, peaks at about 3,300 $cm^{-1}$ to about 3,500 $cm^{-1}$ represent the presence of alcohol (—OH) functional group.

This FT-IR analysis shows that the polishing pad without a hardness regulator (of the Comparative Example) was substantially the same as the polishing pads with the hardness regulator of $H_{12}MDI$ (in Examples 3 and 5). Accordingly, the presence or absence of the hardness regulator may not affect the material structure of the polishing pad.

Further, in the FT-IR curves (b) and (c) of FIG. 3, the polishing pad containing $H_{12}MDI$ of 15 wt % (in Example 3) was substantially the same as the polishing pad containing $H_{12}MDI$ of 25 wt % (in Example 5). Accordingly, the content of the hardness regulator may not affect the material structure of the polishing pad.

Dependence on the Content of the Hardness Regulator

Figure 4A:
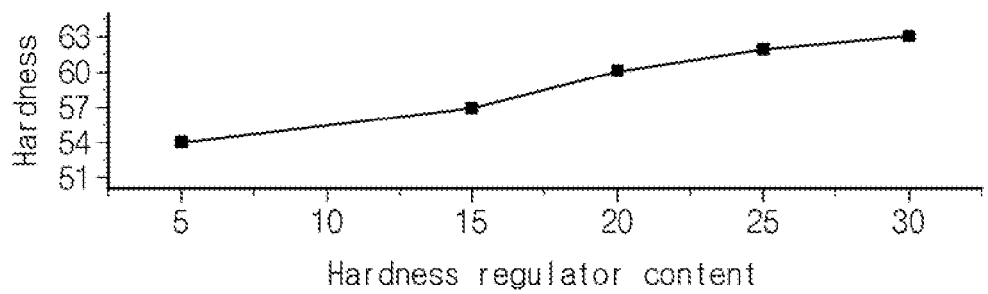
FIGS. 4A through 4C illustrate graphs showing hardness, tensile strength, and elongation ratio properties of polishing pads.
Figure 4B:
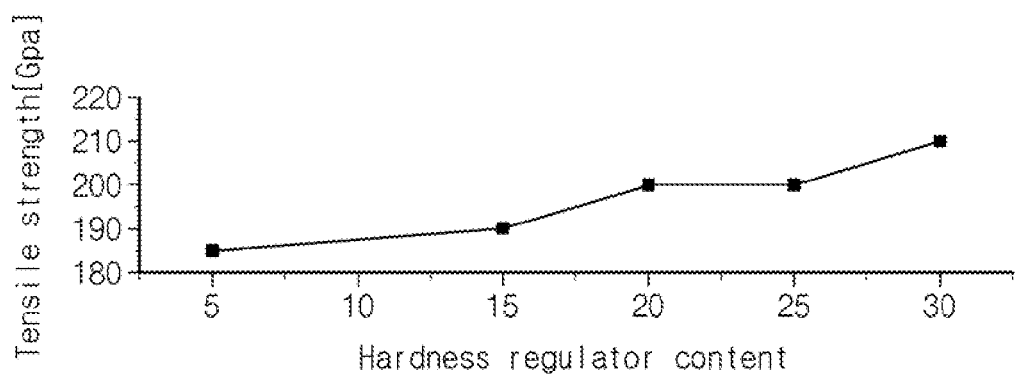
Figure 4C:
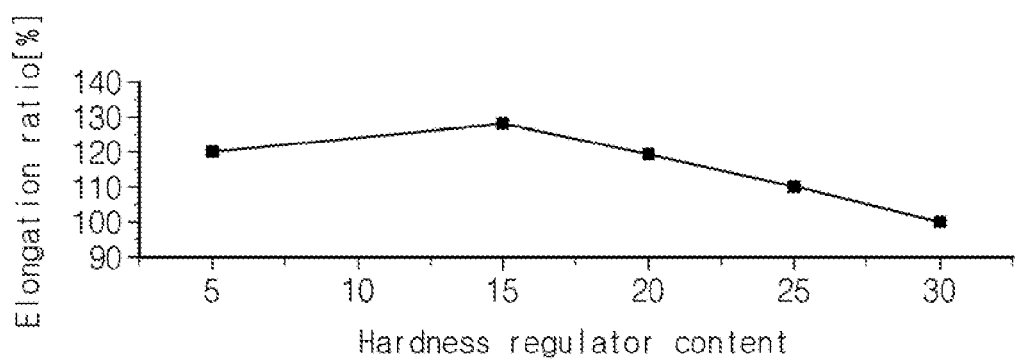

FIGS. 4A through 4C illustrate graphs showing hardness, tensile strength, and elongation ratio properties of the polishing pads of Examples 1 and 3 to 6.

FIG. 4A illustrates a graph showing a hardness of a polishing pad versus a content of $H_{12}MDI$ in the pre-polymer of the polishing pad. In FIG. 4A, the x-axis shows the content (wt %) of $H_{12}MDI$ in the pre-polymer of the polishing pad compound, and the y-axis shows the hardness (shore D) of the polishing pad.

Referring to FIG. 4A, as the content of the $H_{12}MDI$ in the pre-polymer of the polishing pad compound increased from 5 wt % to 30 wt %, the hardness of the polishing pad increased from about 54D to 62D. Such an increase in hardness of the polishing pad may be achieved due to the presence of the $H_{12}MDI$ between adjacent hard segments in the polishing pad compound.

FIG. 4B illustrates a graph showing a tensile strength of a polishing pad versus a content of $H_{12}MDI$ in the pre-polymer of the polishing pad. In FIG. 4B, the x-axis shows the content ratio (wt %) of $H_{12}MDI$ in the pre-polymer of the polishing pad compound, and the y-axis shows the tensile strength (GPa) of the polishing pad.

Referring to FIG. 4B, as the content of the $H_{12}MDI$ in the pre-polymer of the polishing pad compound increased from 5 wt % to 30 wt %, the tensile strength of the polishing pad increased from about 185 GPa to about 210 GPa. Such an increase in tensile strength of the polishing pad may be achieved by the $H_{12}MDI$ between adjacent hard segments in the polishing pad compound.

FIG. 4C illustrates a graph showing an elongation ratio of a polishing pad versus a content of $H_{12}MDI$ in the pre-polymer of the polishing pad. In FIG. 4C, the x-axis shows the content ratio (wt %) of $H_{12}MDI$ in the pre-polymer of the polishing pad compound, and the y-axis shows the elongation ratio (%) of the polishing pad.

Referring to FIG. 4C, as the content of the $H_{12}MDI$ in the pre-polymer of the polishing pad compound increased from 5 wt % to 30 wt %, the elongation ratio of the polishing pad decreased effectively from about 120% to about 100%. This may be because the inclusion of $H_{12}MDI$ in the polishing pad compound results in a reduction in content of the polyol causing a reduction in the elongation ratio.

The following Table 2 shows a material characteristic of the polishing pad versus a content of the hardness regulator used in Examples 1 and 3-6.

TABLE 2

| | Pore size (μm) | Specific weight (%) | Asperity (μm) | Hardness of polishing pad (shore D) | Hardness of polishing pad compound (shore D) |
|---|---|---|---|---|---|
| Example 1 | 32 | 0.80 | 2.0 | 56 | 70 |
| Example 3 | 32 | 0.78 | 2.0 | 57 | 72 |
| Example 4 | 33 | 0.81 | 2.0 | 53 | 74 |
| Example 5 | 32 | 0.78 | 2.0 | 57 | 72 |
| Example 6 | 34 | 0.85 | 2.0 | 54 | 75 |

As shown in Table 2, the polishing pads according to Examples 1 and 3 to 6 had a pore size ranging from about 32 μm to about 34 μm, a similar specific weight ranging from about 0.78% to about 0.85%, and substantially the same asperity of about 2.0 μm.

When measured on a shore-D test apparatus, the polishing pad compounds had a shore-D hardness of 70-75, and the polishing pad, which is a final product, had a shore-D hardness of 53 -57.

CMP Process

Figure 5:
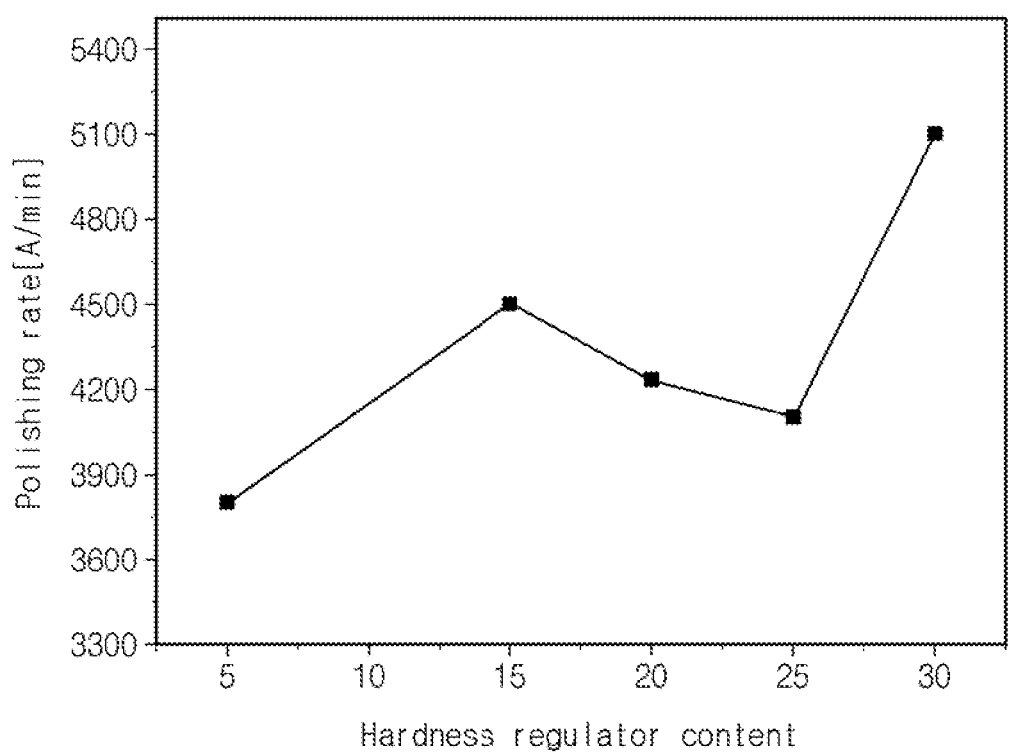
FIG. 5 illustrates a graph showing a relationship between a polishing rate of polishing-target surface and a content of hardness regulator, in a CMP process using polishing pads according to example embodiments.

FIG. 5 illustrates a graph showing a relationship between a polishing rate of a polishing-target surface and a content of a hardness regulator, in a CMP process using polishing pads according to example embodiments.

A polishing rate of a polishing-target surface was measured by the CMP system of FIG. 2. The polishing-target surface was a tetraethylortho silicate (TEOS) layer formed on a wafer, and ceria slurry ($CeO_2$) and silica slurry ($SiO_2$) were used as the slurry in the CMP process.

The polishing pads were prepared from the polishing pad compounds formed using the methods described with reference to Examples 1 and 3 to 6. In particular, during measuring the polishing rate in the CMP process, the content of —N=C=O was fixed at 9.3 wt % and the amount of $H_{12}MDI$ in the pre-polymer of the polishing pad compound was changed.

Referring to FIG. 5, the polishing rate increased when the content of the $H_{12}MDI$ in the pre-polymer increased from 5 wt % to 15 wt %, but the polishing rate decreased when the content of the $H_{12}MDI$ increased from 15 wt % to 25 wt %. The increase of the polishing rate in the range from 5 wt % to 15 wt % may result from an increase of a contact area between the polishing pad and the surface of the substrate. However, in the range from 20 wt % to 25 wt %, such an increase in contact area between the polishing pad and the surface of the substrate may lead to a reduction in pressure applied to the wafer, and thus, it may be hard to make a contact between ceria particles and a wafer surface. However, in the case that the content of $H_{12}MDI$ was 30 wt %, the polishing rate had a maximum value. This may mean that the polishing rate was dominantly affected by an effect of asperity pressure, rather than the contact area effect. In this experiment, the dishing failure of the semiconductor device may be expected to be minimized, when the content of $H_{12}MDI$ in the pre-polymer is 5 wt %.

Oxide Dishing

Figure 6A:
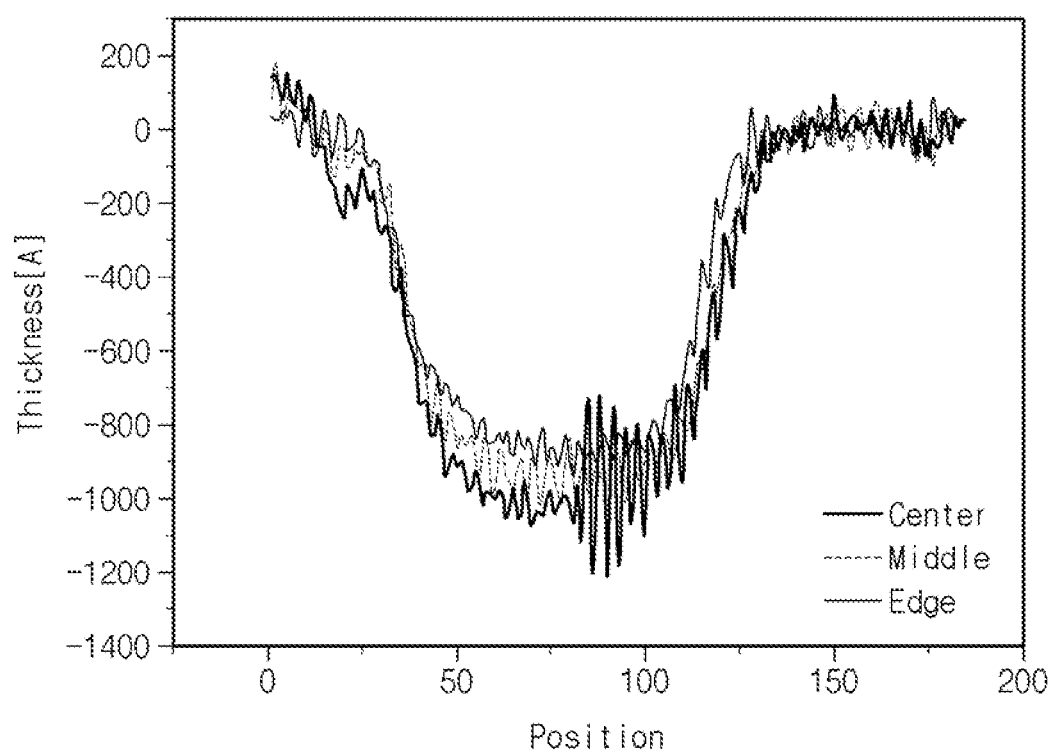
FIGS. 6A and 6B illustrate graphs for illustrating oxide-dishing phenomena in CMP processes using polishing pads according to a Comparative Example and the example embodiments.
Figure 6B:
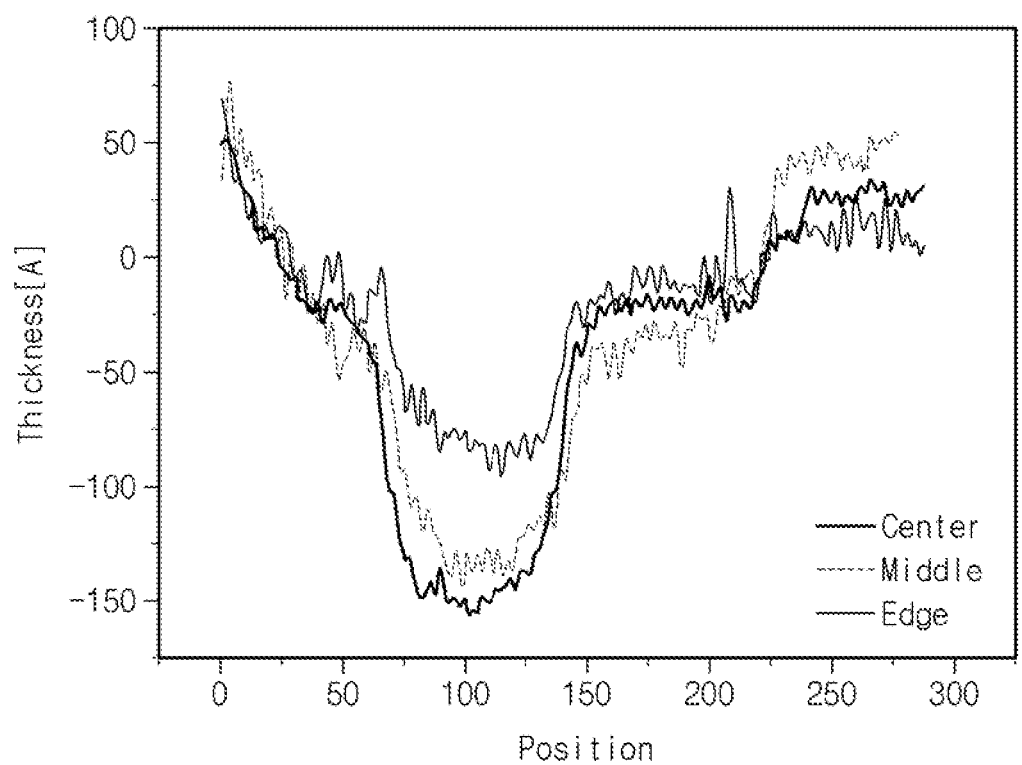

FIGS. 6A and 6B illustrate graphs showing oxide-dishing phenomena in CMP processes using polishing pads according to the comparative example and the example embodiments.

A dishing phenomenon on a polishing-target surface was observed during performing a CMP process on the polishing-target surface using the CMP system of FIG. 2. The polishing-target surface was the oxide layer formed on the wafer, and tetraethylortho silicate (TEOS) was used as a counter material. Ceria slurry ($CeO_2$) and silica slurry ($SiO_2$) were used as the slurry.

FIGS. 6A and 6B were obtained from polishing pads that were formed from the polishing pad compounds according to the Comparative Example and Example 5.

Dishing may occur when an over polishing process is performed. For example, like in the shallow trench isolation (STI) process, the over polishing process may be performed to remove a remaining substance, after a polishing-stop layer is exposed. In the STI region, the polishing pad is in direct contact with an oxide layer, and thus, an actual contact point becomes important. Accordingly, by controlling the asperity of polishing pad and the content of $H_{12}MDI$, the polishing pad hardness may be directly involved with, e.g., may affect, the dishing phenomena.

Referring to FIG. 6A, for the Comparative Example, the oxide dishing of about 1,400 Å occurred.

Referring to FIG. 6B, the polishing pad compound of Example 5 was formed in such a way that the content of $H_{12}MDI$ in the pre-polymer was 25%, and the oxide dishing thereof was about 150 Å.

By way of summation and review, a CMP system may have a polishing pad, a polishing head (configured to rotate along with the wafer while applying a pressure to the wafer), and a slurry supplying part. The slurry may include abrasives and acid or basic solution. The wafer may rotate relative to and in contact with the polishing pad, on which the slurry is supplied. As a result, the wafer or a film thereon may be chemically reacted with the acid or basic solution and may be mechanically polished by the abrasives. Efficiency of the CMP process may be affected by a CMP apparatus, a composition of slurry compound, and hardness of a polishing pad. Hardness of a polishing pad may be important in a chemical mechanical polishing process. e.g., in the case where the polishing pad has a low hardness, a dishing phenomenon may occur.

The embodiments may provide a polishing pad composition for a CMP system.

The embodiments may provide a polishing pad composition having a hardness that is in a suitable range for uniformly polishing a wafer. The embodiments may provide a polishing pad having high hardness and that helps prevent dishing and consequent failures.

According to example embodiments, an amount of hardness regulator may be adjusted to provide a polishing pad with desired hardness. Thus, it may be possible to enlarge the application range of the CMP process.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polishing pad compound, comprising:
   a pre-polymer; and
   a methylenebis(2-chloroaniline) hardener,
   wherein the pre-polymer includes:
      45 wt % to 50 wt % of a polyol, the polyol being a 1:1:1 mixture of poly tetramethylene glycol, poly ethylene glycol, and poly propylene glycol,
      5 wt % to 25 wt % of a hardness regulator, and
      a balance of an isocyanate, and
   wherein the pre-polymer and the methylenebis(2-chloroaniline) are mixed in an equivalent weight ratio of 1:1.

2. The polishing pad compound as claimed in claim 1, wherein the polyol has a molecular mass of 1,000 or higher.

3. The polishing pad compound as claimed in claim 1, wherein the hardness regulator includes dicyclohexylmethane-4,4'-diisocyanate.

4. The polishing pad compound as claimed in claim 1, wherein the isocyanate includes toluene diisocyanate.

5. The polishing pad compound as claimed in claim 1, wherein the pre-polymer includes 9.0 wt % to 9.5 wt % of a —N=C=O group.

6. The polishing pad compound as claimed in claim 1, wherein the polishing pad compound has a shore-D hardness of 70 to 75.

7. A polishing pad prepared using the polishing pad compound as claimed in claim 1.

8. The polishing pad as claimed in claim 7, wherein:
   the polyol of the polishing pad compound forms a soft segment in the polishing pad,
   the isocyanate forms a hard segment in the polishing pad, and
   the hardness regulator is included between hard segments in the polishing pad.

* * * * *